J. D. C. POWNALL & H. BROOMELL.
ANIMAL-TRAP.

No. 188,753. Patented March 27, 1877.

Witnesses
Binton Walter
Harry P. Cooper

Inventors
Jos. D. C. Pownall
Henry Broomell

By

Attorneys

UNITED STATES PATENT OFFICE.

JOSEPH D. C. POWNALL AND HENRY BROOMELL, OF CHRISTIANA, PA.

IMPROVEMENT IN ANIMAL-TRAPS.

Specification forming part of Letters Patent No. 188,753, dated March 27, 1877; application filed January 22, 1877.

*To all whom it may concern:*

Be it known that we, JOSEPH D. C. POWNALL and HENRY BROOMELL, of Christiana, in the county of Lancaster and State of Pennsylvania, have invented certain new and useful Improvements in Animal-Traps, of which the following is a specification:

Our invention relates to animal-traps of the class known as "steel-traps," in which a pair of jaws are actuated by a spring or springs, and caused to seize and hold the game; and consists of a novel method of constructing the springs, and an improved self-setting mechanism, together with an improved attachment for the chain.

Figure 1:
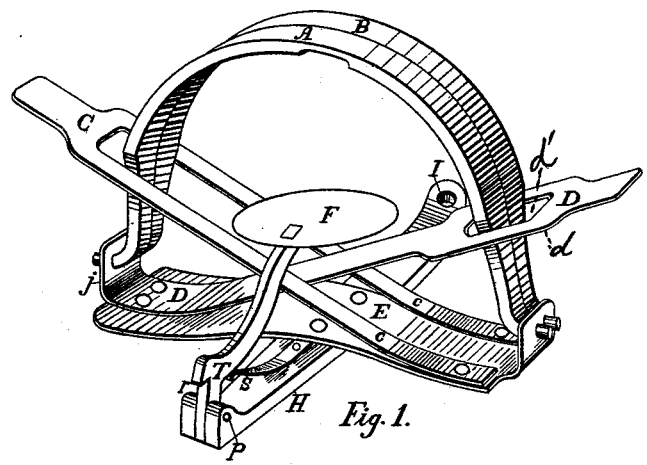
Figure 2:
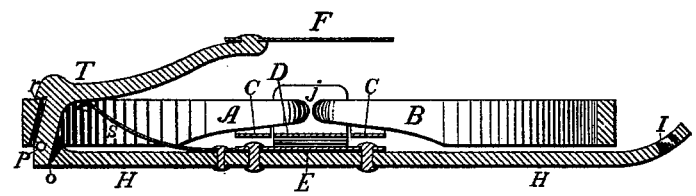

In the accompanying drawings, forming a part of this specification, Figure 1 is a perspective view of the trap, and Fig. 2 a transverse section of the same when set.

A and B are the jaws, which are made in the ordinary manner, being semicircular pieces with pivots at the ends, and the parts near the ends being tapered to adapt them to the clasping action of the springs. C and D are the springs which actuate the jaws, and E the bed-piece to which they are attached. The construction and arrangement of these springs are clearly shown in Fig. 1. C is an open-ended forked spring, consisting, for the greater part of its length, of two parts or arms, which are united in one near the free or movable end. The spring D, for the most part, is of such a width that it may pass between the arms of the other, but is provided with a widened part, $d$, through which is cut an opening, $d'$, for the reception of the jaws. This widened portion of the spring D thus envelops and clasps the jaws at one end, while the other end is enveloped and clasped by the arms of the forked spring near their junction, each spring extending thence, mainly, toward the opposite ends of the trap, passing each other, and being secured to the bed-piece near its opposite ends. The end of the spring D is extended beyond the point of attachment to the bed-piece, and, being pierced with holes to receive the pivots, is turned up, as seen at $j$, and used as one of the bearings for the jaws. The opposite ends of the jaws are pivoted in a turned-up portion of the bed-piece.

The advantages to be derived from this construction are, first, that while we secure abundant length of spring, and consequent movement and elevation upon the jaws, which are necessary to make a powerful trap, the springs may be made with great economy of material, as the long narrow portion of the one may be cut from between the arms of the other; and, second, that while no special piece or pieces other than the bed-piece and springs are required for attaching or supporting the jaws, the trap is very easily put together by first inserting the pivots of the jaws in their bearings on the bed-piece and the end of the spring D, and then riveting the latter to its place, after which the spring C may be put in place and secured to the bed-piece.

To make a self-setting trap—that is, one in which, when the springs are depressed and the jaws fall, suitable mechanism acts, without further manipulation, to prevent a reaction of these parts—we combine therein a trigger, with other necessary parts, as follows: In the drawings, H is a bar, secured transversely to the bed-piece E. T is the trigger, which may be of any form suitable for the purpose. It is inserted in a slot in the end of the bar H, and secured by the pin $p$, upon which it turns to a limited extent. It is provided with an arm extending toward the center of the trap, to which is attached the tread-pan F, and also with a hook or catch, $r$, for holding the jaw. S is a delicate spring, placed under the arm of the trigger, which lifts the same, and causes the hook to engage the jaw, as will be shown. To limit the movement of the trigger in the direction given it by the spring the lower end is made to come in contact with the inner surface of the slot in the bar H at the point $o$, Fig. 2.

In order to set the trap it is only necessary to depress the springs by pressure upon their free ends, when the jaws will fall, or may be easily carried down. The jaw A, in its descent, strikes the slope of the hook $r$, forcing the trigger back against the pressure of the spring S until the point of the hook has been passed by the jaw, when the spring causes the trigger to react, bringing the hook over the jaw, which will be held set by the same when the pressure is removed from the springs C and D. The springs being thus held in tension, the jaw B lies, by its own weight, in a similar position to A. The same reaction of the trigger may be secured by extending it beyond the jaw and pivot, and placing thereon a counterpoise that will overbalance the arm and tread-pan. It is evident that when the game strikes the tread-pan, depressing it, the jaw A will be released and the trap thrown.

It will readily be seen that the trap may be very quickly and easily set, and without danger to the operator.

The opposite end of the bar H from that which supports the trigger is extended beyond the point reached by the jaw B when the trap is set, and the end which is pierced with a hole for the attachment of a chain has an upward turn, I, to prevent the first link of the chain from interfering with the proper resting of the trap upon the ground. The extension of this bar in both directions from the bed-piece E gives the trap a good foundation.

We claim as our invention—

1. In a steel-trap, the jaws A and B, in combination with the springs C and D, when constructed and arranged to operate substantially as described.

2. In combination with the tread-pan and one of the jaws of a steel-trap, a trigger which, aided by a spring or its equivalent, operates automatically in setting the trap to catch and hold the said jaw, substantially as and for the purpose described.

3. In a steel-trap, the trigger T and spring S, or its equivalent, in combination with the jaw A, the tread-pan F, and the transverse bar H, these members constructed to operate substantially as described.

4. The transverse bar H, extended beyond the point reached by the jaw B when the trap is set and the upward turn given thereto, for the purpose described.

JOS. D. C. POWNALL.
HENRY BROOMELL.

Witnesses:
BRINTON WALTER,
HARRY P. COOPER.